(12) United States Patent
Freeman

(10) Patent No.: US 7,415,998 B2
(45) Date of Patent: Aug. 26, 2008

(54) TREE JACK

(76) Inventor: Charles J. Freeman, 1996 Addison Rd., Lipan, TX (US) 16462

( * ) Notice: Subject to any disclaimer, the term of this patent is extended or adjusted under 35 U.S.C. 154(b) by 173 days.

(21) Appl. No.: 11/307,275

(22) Filed: Jan. 30, 2006

(65) Prior Publication Data

US 2007/0175542 A1   Aug. 2, 2007

(51) Int. Cl.
*A01G 23/04* (2006.01)
*A01G 23/06* (2006.01)

(52) U.S. Cl. .................. 144/4.1; 144/24.12; 37/302

(58) Field of Classification Search ............ 144/24.12, 144/4.1, 34.1; 37/302; 294/88; 414/718, 414/444, 445, 450, 451, 453, 729, 739, 740
See application file for complete search history.

(56) References Cited

U.S. PATENT DOCUMENTS

| | | | |
|---|---|---|---|
| 3,802,663 A | 4/1974 | Widegren | |
| 4,144,918 A | 3/1979 | Hallstrom | |
| D264,213 S | 5/1982 | Hedblom | |
| 4,332,093 A * | 6/1982 | Berthollet | 111/101 |
| 4,481,989 A * | 11/1984 | Peters | 144/335 |
| 4,494,325 A * | 1/1985 | Berthollet | 111/101 |
| 4,606,694 A * | 8/1986 | Meisel et al. | 414/732 |
| 5,479,731 A | 1/1996 | Widegren | |
| 5,671,788 A | 9/1997 | Rewis | |
| 5,829,497 A * | 11/1998 | Maroney | 144/24.12 |
| 6,010,294 A | 1/2000 | Lyddon | |

\* cited by examiner

*Primary Examiner*—Shelley M. Self

(57) ABSTRACT

A novel lifting tool for lifting rooted trees and the like from the ground. There is: at least one main boom; at least one outrigger coupled to a first end of the main boom; at least one mounting member coupled to a second end of the main boom, the mounting member adapted to couple the main boom to a lifting force machine; and at least one set of tongs coupled to the main boom, the tongs adapted to clamp a tree or the like to be lifted around at least a portion of the periphery of the tree or the like, and lift the tree or the like when the main boom is lifted. The tongs are located along the main boom at a position to multiply the force input by the lifting force machine. In the preferred embodiment, the lifting force machine is subsumed by a skid loader.

17 Claims, 2 Drawing Sheets

TREE JACK

BACKGROUND OF THE INVENTION

1. Field of the Invention

The present invention generally relates to the removal of trees, shrubberies and the like.

2. Description of the Related Art

Tree removal methods are typically limited to either elaborate and very large tree trunk digging approaches, or those involving lifting trees with smaller equipment such as skid loaders. The former approach is both costly, and leaves a large hold in the ground after removal. The latter approach greatly limits the size of the trees or shrubberies that can be lifted, since a typical skid loader may only be able to supply a lifting force of about 3,500 pounds.

What is desirable but not provided by the prior art is an approach for lifting larger trees from the ground using only skid loaders, while not leaving large ground holes afterwards.

SUMMARY OF THE INVENTION

The present invention has been developed in response to the present state of the art, and in particular, in response to the problems and needs in the art that have not yet been fully solved. Accordingly, the present invention has been developed to provide a novel lifting tool suitable for lifting rooted trees and the like from the ground that at least includes the following: a least one main boom; at least one outrigger coupled to a first end of the main boom; at least one mounting member coupled to a second end of the main boom, the mounting member adapted to couple the main boom to a lifting force machine; and at least one set of tongs coupled to the main boom, the tongs adapted to clamp a tree or the like to be lifted around at least a portion of the periphery of the tree or the like, and lift the tree or the like when the main boom is lifted. The tongs are located along the main boom at a position to multiply the force input by the lifting force machine. In the preferred embodiment, the lifting force machine is subsumed by a skid loader.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
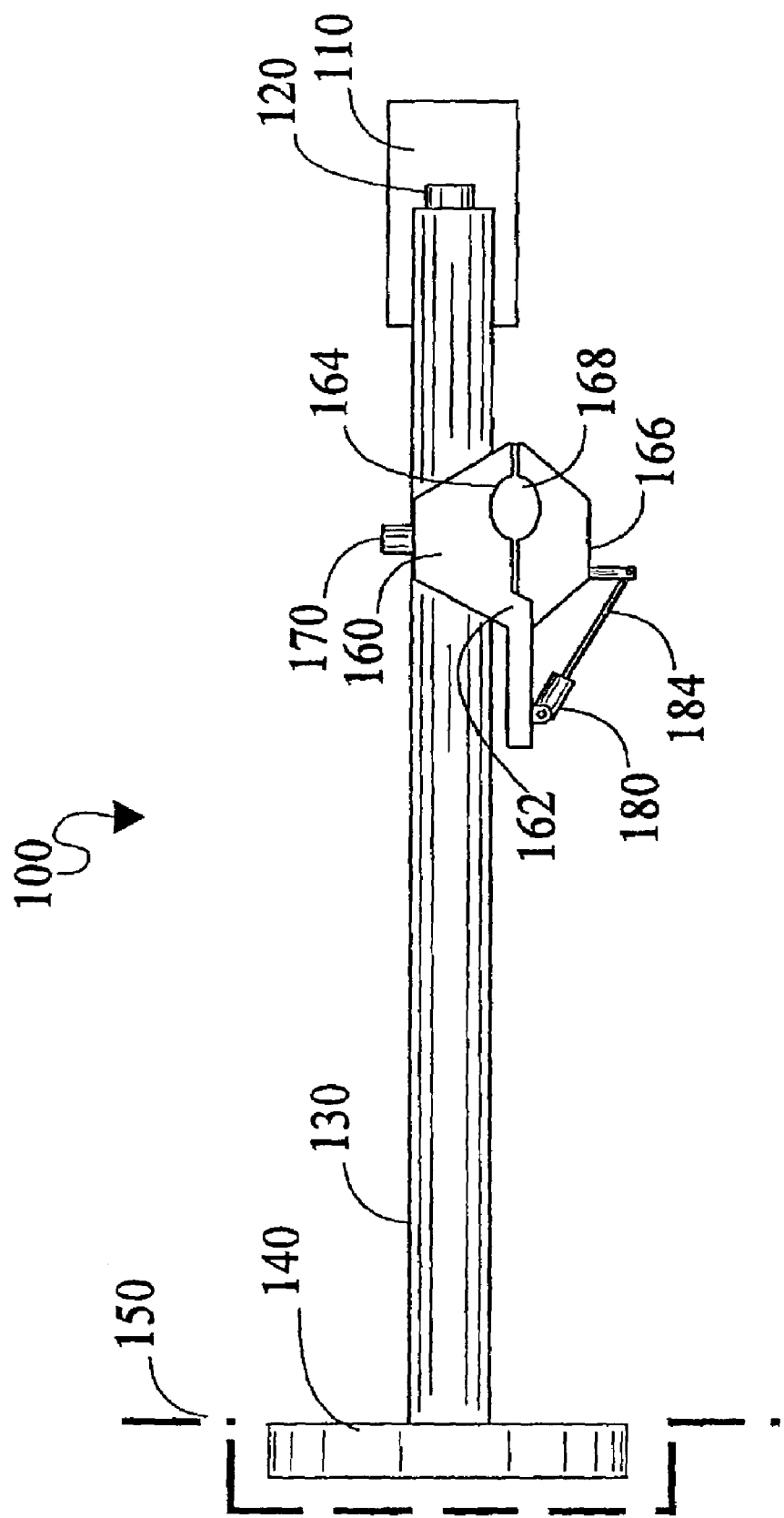
FIG. 1 is a plan view as seen from the top, of a first embodiment of the present-inventive tree jack/lifting tool.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Turning to FIG. 1, the present-inventive tree jack/lifting tool is used as a force multiplier to lift trees, shrubberies and the like from the ground. The tree jack 100 nominally includes a main boom 130, an outrigger 110 coupled via a coupler 120 to an end of the main boom for engaging with the ground and distributing the load upon the ground. At the other end of the main boom is a mounting plate or quick attach plate 140 for attaching the tree jack 100 to the lifting arms of a lifting force machine symbolically represented by the number 150. In the preferred embodiment, the lifting force machine 150 is part of a skid loader, although those skilled in the art will appreciate that other mobile and stationary equipment could be used.

A set of tongs 160 are secured to the main boom by a coupler 170. In the preferred embodiment, the tongs 160 can be secured to more than one location of the boom. As can be seen, tongs 162 and 166 are pivotally attached, and contain teeth 164 and 168, respectively, to grip a tree to be removed from the ground. A hydraulic cylinder 180 moves a hydraulic arm 184 to open and close the tongs as desired.

Hydraulic lines connect to hydraulic ports on the skid loader to supply hydraulic fluid to the tongs 160. In operation, lifting a secured tree at a position near the outrigger has the effect of multiplying the lifting force (e.g., a mechanical advantage) imparted by the lifting force machine (recall that this is subsumed by the skid loader) via the mounting plate. As a result, the increased torque allows the skid loader to effectively impart a lifting force considerably larger than possible without the use of the jack/lifting tool, thereby allowing larger or more securely lodged trees and shrubberies to be removed from the ground.

Figure 2:
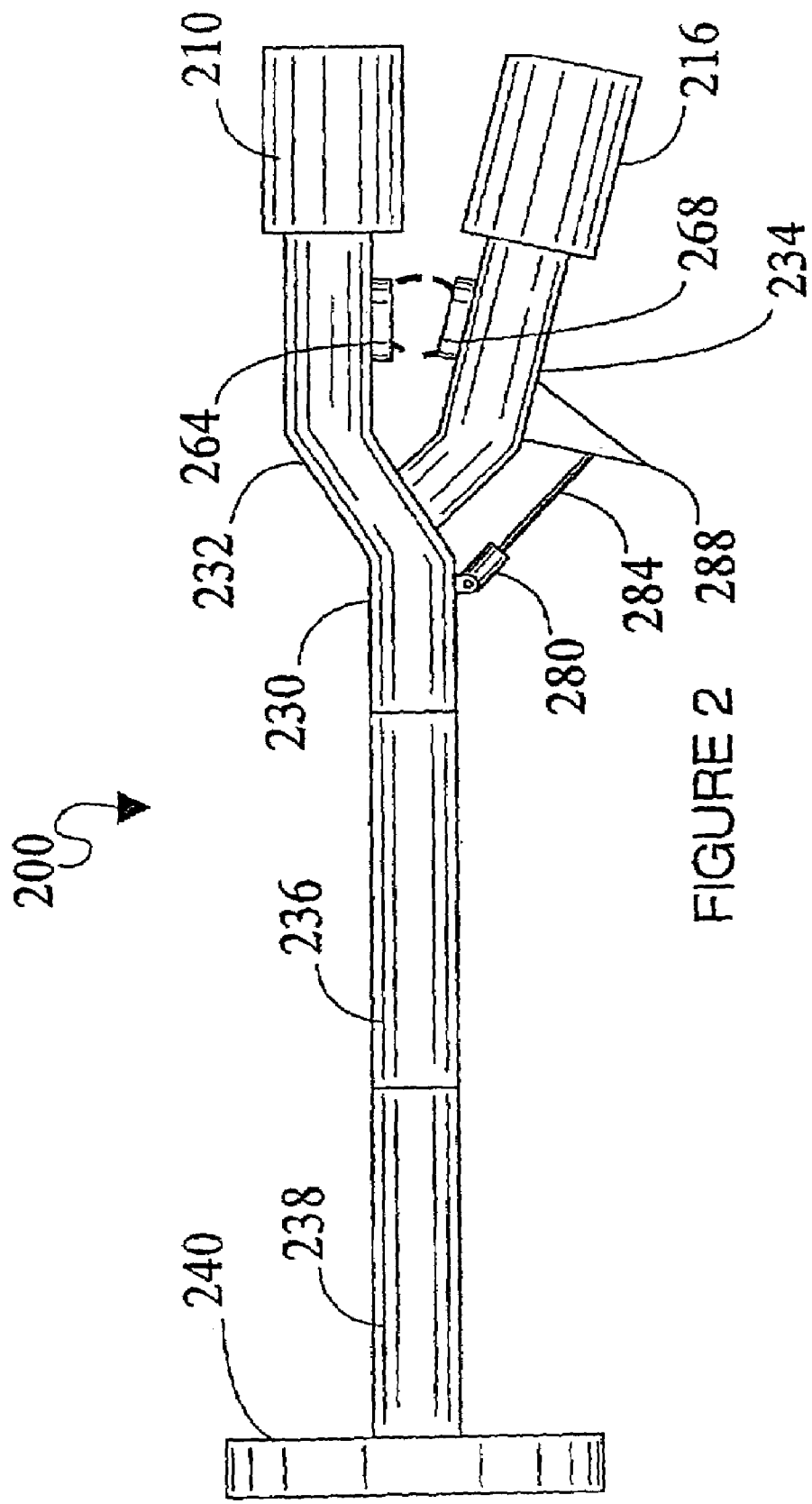
FIG. 2 is a plan view as seen from the top, of a second embodiment of the present-inventive tree jack/lifting tool.

FIG. 2 shows an alternate embodiment 200 of the present-inventive tree jack. In addition to a main boom 230, a main outrigger 210, a mounting plate 240, a hydraulic cylinder 280, and a hydraulic arm 284, the jack/lifting tool 200 also contains an auxiliary boom 234 with an outrigger 216. The boom ends 232 and 234 have tooth dies 264 and 268, respectively, used to form a set of tongs and grip a tree or shrubbery 296 to be lifted from the ground. The two booms are forced together to engage with the tree by the hydraulic action of the cylinder and arm 280 and 284 upon a lever 288. The moment arm and hence the amount of torque applied to the "tongs" can be adjusted by attaching the hydraulic arm to different points of the lever 288.

The length of the main boom can be adjusted by positioning and locking telescopic boom sections 236 and 238.

It is expected that there could be numerous variations of the design of this invention.

Finally, it is envisioned that the components of the device may be constructed of a variety of materials.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A lifting tool suitable for lifting rooted trees and the like from the ground, said lifting tool comprising:
    a least one main boom;
    at least one outrigger coupled to a first end of said main boom;
    at least one mounting member coupled to a second end of said main boom, said mounting member adapted to couple said main boom to a lifting force machine; and
    at least one set of tongs coupled to said main boom, said tongs adapted to clamp a tree to be lifted around at least a portion of the periphery of said tree, and lift said tree when said main boom is lifted;
    wherein said tongs are located along said main boom at a position between said outrigger and said mounting member.

2. The lifting tool of claim 1, wherein said lifting force machine is subsumed by a skid loader.

3. The lifting tool of claim 1, further comprising:
    a hydraulic cylinder; and
    a hydraulic arm operatively coupled to said hydraulic cylinder;
    wherein said hydraulic cylinder and said hydraulic arm cooperate to open and forcibly close said tongs.

4. The lifting tool of claim 3, further comprising:
    hydraulic lines coupled to said hydraulic cylinder, and adapted to couple operational hydraulic fluid to said hydraulic cylinder.

5. The lifting tool of claim 4, wherein said lifting force machine is subsumed by a skid loader, and wherein said hydraulic lines are adapted to be coupled to hydraulic ports carried by said skid loader.

6. The lifting tool of claim 1, further comprising:
    an auxiliary boom pivotally coupled to said main boom; and
    an auxiliary outrigger coupled to said auxiliary boom;
    wherein said main boom and said auxiliary boom comprise tooth dies on opposing boom surfaces to form said tongs.

7. The lifting tool of claim 6, wherein said tooth dies are removable.

8. The lifting tool of claim 6, further comprising:
    a hydraulic cylinder; and
    a hydraulic arm operatively coupled to said hydraulic cylinder;
    wherein said hydraulic cylinder and said hydraulic arm coupled between said main boom and said auxiliary boom and cooperate to open and forcibly close said tongs.

9. The lifting tool of claim 8, wherein said auxiliary boom further comprises:
    an adjustable hydraulic arm receiving lever coupled between said auxiliary boom and said hydraulic arm, said hydraulic receiving arm lever adapted to couple said hydraulic arm at different locations to vary the torque applied to said tongs.

10. The lifting tool of claim 1, wherein said main boom further comprises:

at least one telescopic boom section coupled to said mounting member.

11. The lifting tool of claim 6, wherein said main boom further comprises:

at least one telescopic boom section coupled to said mounting member.

12. A lifting tool suitable for lifting rooted trees and the like from the ground, said lifting tool consisting of:

a least one main boom;

at least one outrigger coupled to a first end of said main boom;

at least one mounting member coupled to a second end of said main boom, said mounting member adapted to couple said main boom to a lifting force machine; and at least one set of tongs coupled to said main boom, said tongs adapted to clamp a tree to be lifted around at least a portion of the periphery of said tree, and lift said tree when said main boom is lifted;

wherein said tongs are located along said main boom at a position between said outrigger and said mounting member.

13. The lifting tool of claim 12, wherein said lifting force machine is subsumed by a skid loader.

14. A lifting tool suitable for lifting rooted trees and the like from the ground, said lifting tool consisting essentially of:

a least one main boom;

at least one outrigger coupled to a first end of said main boom;

at least one mounting member coupled to a second end of said main boom, said mounting member adapted to couple said main boom to a lifting force machine; and at least one set of tongs coupled to said main boom, said tongs adapted to clamp a tree to be lifted around at least a portion of the periphery of said tree, and lift said tree when said main boom is lifted;

wherein said tongs are located along said main boom at a position between said outrigger and said mounting member.

15. The lifting tool of claim 14, wherein said lifting force machine is subsumed by a skid loader.

16. The lifting tool of claim 14, further consisting essentially of:

a hydraulic cylinder; and a hydraulic arm operatively coupled to said hydraulic cylinder;

wherein said hydraulic cylinder and said hydraulic arm cooperate to open and forcibly close said tongs.

17. The lifting tool of claim 16, further consisting essentially of: hydraulic lines coupled to said hydraulic cylinder, and adapted to couple operational hydraulic fluid to said hydraulic cylinder.

* * * * *